United States Patent
Russell et al.

(10) Patent No.: US 12,204,864 B2
(45) Date of Patent: *Jan. 21, 2025

(54) DYNAMIC SEMANTIC ROLE CLASSIFICATION

(71) Applicant: Bank of America Corporation, Charlotte, NC (US)

(72) Inventors: Jennifer Russell, Dallas, TX (US); Emad Noorizadeh, Plano, TX (US); Rajan Jhaveri, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 290 days.

This patent is subject to a terminal disclaimer.

(21) Appl. No.: 17/993,019

(22) Filed: Nov. 23, 2022

(65) Prior Publication Data

US 2024/0169156 A1 May 23, 2024

(51) Int. Cl.
*G06F 40/30* (2020.01)
*G06F 40/284* (2020.01)
*G06F 40/40* (2020.01)

(52) U.S. Cl.
CPC ............ *G06F 40/30* (2020.01); *G06F 40/284* (2020.01); *G06F 40/40* (2020.01)

(58) Field of Classification Search
CPC ......... G06F 40/30; G06F 40/284; G06F 40/40
USPC .......................... 704/231, 237, 239, 246, 251
See application file for complete search history.

(56) References Cited

U.S. PATENT DOCUMENTS 8,700,404 B1 * 4/2014 Chotimongkol ........ G10L 15/18
704/255

* cited by examiner

*Primary Examiner* — George C Monikang
(74) *Attorney, Agent, or Firm* — Weiss & Arons LLP

(57) ABSTRACT

A system for dynamic semantic role classification, through an entity's natural language process (NLP) pipeline is provided. The system may include assigning semantic role classifiers to tokens included in utterances received from user nodes. The system may include using a machine learning algorithm to assign the semantic role classifiers. The machine learning algorithm may assign the semantic role classifiers based on a calculated correlation value. The machine learning algorithm may use training and testing data sets to dynamically update the semantic role classifiers.

20 Claims, 5 Drawing Sheets

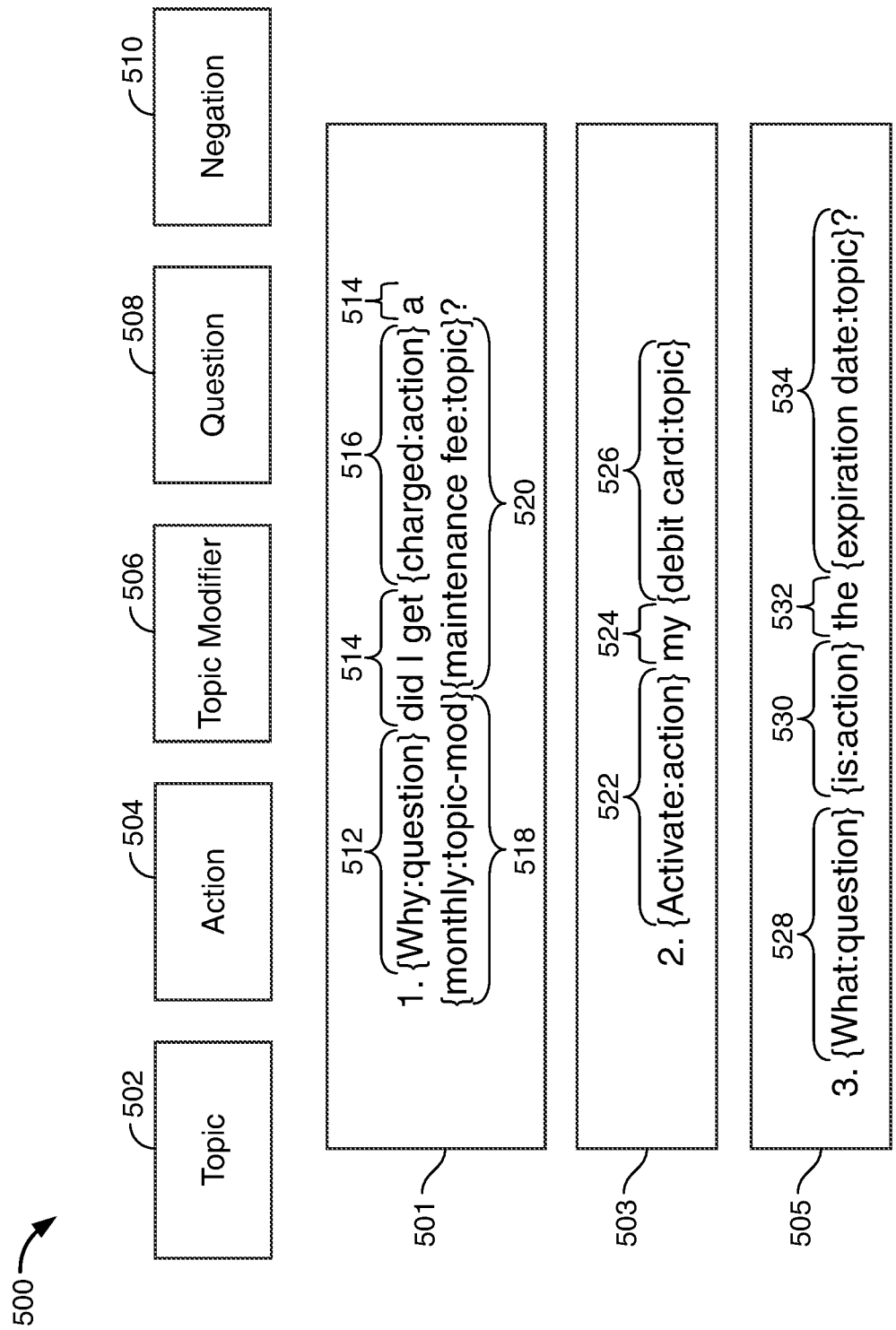

DYNAMIC SEMANTIC ROLE CLASSIFICATION

CROSS-REFERENCE TO RELATED APPLICATION

Co-pending U.S. patent application Ser. No. 17/993,029, entitled, "SEMANTIC FRAME BUILDER", filed on even date herewith is hereby incorporated by reference herein in its entirety.

FIELD OF TECHNOLOGY

The field of technology relates to natural language processing. Specifically, this field of technology relates to natural language processing for voice response systems.

BACKGROUND OF THE DISCLOSURE

In recent years, entities have decreased human interactions with callers in favor of interactive voice response systems ("IVRs"). These IVRs communicate with humans using a variety of communication methods. These communication methods include telephone calls, short messaging service ("SMS") messages, multimedia messaging service ("MMS") messages and other suitable communication methods.

Typically, the IVRs respond to a human inquiry using the communication method with which the human initiated the inquiry.

Because of the widespread usage of IVRs, it has become increasingly important to correctly identify the intent of the query and correctly respond to the human inquiry. As such, effort has been placed into technically reproducing a human's response system. Therefore, it would be desirable to have a classification module for an IVR system.

It would be desirable for the classification module to classify the components of the human's inquiry. It would be further desirable to classify these components based on a limited set of semantic classifiers that correspond to the industry category with which the entity is associated. For example, it would be desirable to classify the components of a human inquiry using semantic classifiers for a financial industry, a specific business industry, a government industry or any other suitable industry.

SUMMARY OF THE DISCLOSURE

Systems, apparatus, and methods for dynamic semantic role classification are provided. Methods may include receiving, at an entity's Interactive Voice Response (IVR) system, an utterance from a node. The IVR may be a computing system, network of computing devices, or any other suitable system configured to interact with a node. The IVR may be configured to interact with a node via voice recognition systems, messaging interfaces or any other suitable communication system.

The IVR system may enable communication between a computing device and a node. The node may or may not be a component of the entity's IVR system. As such, the node may be an entity separate from the entity's IVR system. The computing device may be any suitable computing device such as a desktop, a laptop, a tablet, a smartphone, and a mobile device. The node may be a laptop, desktop, smartphone, tablet, or any other suitable computing device.

A node may transmit a message to an entity's IVR system. The message may be transmitted via any suitable communication channel. The message may include an utterance. The utterance may be formed with one or more tokens. The one or more tokens may be one or more words. The entity's IVR system may receive the message from the node. The entity's IVR system may receive the utterance, included in the message.

Methods may include indexing one or more tokens included in the utterance. Indexing the one or more tokens may include identifying the one or more tokens included in the utterance. Indexing may also include identifying the order of the one or more tokens within the utterance. Indexing may also include assigning an index number to each of the one or more tokens. The index number assigned to each token may be based on the number of tokens included in the utterance and the position of each of the one or more tokens within the utterance. For example, an utterance may contain five tokens, "what is my credit score." The first token in the utterance, the token "what," may be indexed as token one, because it is in the first position in relation to the utterance. The token, "credit," may be indexed as token four because it is the fourth token from the beginning of the utterance.

Upon completion of indexing the tokens, methods may include selecting, from the plurality of tokens, a subset of tokens that are appropriate for semantic role classification. An utterance may include pronouns, linking verbs, proper nouns and any other token that may not be helpful in understanding an intent or providing a response to the utterance. Tokens that are not used in identifying an intent or providing a response may not be candidates for semantic role classification. For example, in the utterance "what is my credit score," the token "my," is a pronoun and therefore may not be selected for semantic role classification. The remaining tokens, such as verbs, nouns and adverbs, may be selected for semantic role classification. The selected tokens may be placed in a word group, the word group may also be referred to herein, as a word bin. The word bin may be a virtual container for words that are awaiting classification.

Methods also include, assigning a semantic role classifier to each token in the word bin. There may be a group of semantic role classifiers used to assign semantic roles to tokens. The group may include one or more semantic roles. The group of semantic role classifiers may be industry specific. The semantic role classifiers included in the group may include the following illustrative semantic roles: topic, action, topic-modifier, question and negation.

An action may mean what is happening in the utterance. An action may be a verb. The verb may only be associated with one topic. A topic may be the subject of the action. The topic may be a noun or a compound noun. A topic modifier may be a word describing the topic. The topic-modifier may be an adjective. The adjective may describe the when, how, and where of the topic. A question may use question words, such as; for example, who, what, where, when, why, how, can, could and/or any other suitable question words. A negation may be a word that negates the meaning of the utterance. Examples of negation may include no, nor and/or not. The group of semantic role classifiers may include any other suitable semantic role classifier.

The group of semantic roles may be dynamically updated. Methods may include using a machine learning algorithm to use previously captured data to create training data sets. Training data sets may include a plurality of tokens. Training data sets may resemble production utterances. Training data sets may improve upon pre-made labels that are not industry specific. Training data sets may include historical production utterances. The historical production utterances may accurately classify tokens and thereby train the semantic role classifier. Training data sets may be used by the system to recognize new potential semantic role classifiers. The newly recognized semantic role classifiers may be added to the group of semantic role classifiers.

Testing data sets may be comprised of randomly selected production utterances. A computer-based testing data set may test the accuracy of the determined semantic role classifiers assigned to the selected tokens. The testing data set may help improve the accuracy of the semantic role classifier. The testing data set may determine if the newly recognized semantic roles are effective in classifying the tokens included in the utterance.

For each token, the machine learning algorithm may create an individual model for each semantic role classifier, included in the group of semantic role classifiers.

Each token may be processed by each of the models. As such, each token may be classified as each sematic role and a probability may be assigned to the correlation between the token and the classifier. The classification of each token may include calculating a correlation value. The correlation value may be a correlation probability. The correlation value may be a value that the semantic role classifier accurately describes the token being classified. For example, a first token may be classified as an action, with a correlation probability of 34%. The first token may then be classified as a topic with a correlation probability of 15%. The first token may be classified as a topic modifier, with a correlation probability of 85%. The first token may be classified as a negation, with a correlation probability of 45%. The first token may be classified as a question, with a correlation probability of 18%. The first token may be classified as any potential semantic role classifier included in the group of semantic role classifiers, with a corresponding correlation probability.

A threshold value may also be calculated, for each semantic role classifier. The threshold value may indicate a minimum value, or any other suitable value. The threshold value may be a minimum amount of correlation used, or need, in order for a specific semantic role classifier to be assigned to a token. The threshold value may be a predetermined value. The threshold value may be identified by the machine learning algorithm. When a token is classified as a specific semantic role, the correlation value between the token and the specific semantic role classifier may be at or above the predetermined threshold value.

The following is an illustrative example: a first token may be assigned a first semantic role classifier. Assigning of the first token to the first semantic role classifier may initiate calculating of a correlation value. The correlation value may be calculated based on the strength of the correlation between the token and the semantic role classifier. When the correlation value is determined to be below a predetermined threshold value, the first sematic role may not be assigned to the first token. When the correlation value of the first semantic role classifier is equal to or greater than, the predetermined threshold value, the first semantic role classifier may be assigned to the first token. The process may be repeated for all other semantic role classifiers included in the group of semantic role classifiers. The process may be repeated for one or more other semantic role classifiers included in the group of semantic role classifiers.

At times, upon the calculation of correlation values between a first token and a plurality of semantic role classifiers, there may be more than one semantic role classifier that is assigned a correlation value that is greater than the predetermined threshold value. As such, methods may include comparing the correlation values of the sematic role classifiers that are greater than the predetermined threshold value(s). The semantic role classifier with the highest correlation value may be assigned to the token. The semantic role classifier with any other suitable correlation value may be assigned to the token.

Methods may also include changing a semantic role classifier assigned to a token. Methods may include removing a semantic role classifier assigned to a token. Methods may include adding a semantic role classifier to a token.

At times, the semantic role classifier may use a Java®-based model. The semantic role classifier may also use any suitable model for semantic role classification The classification process, calculation process, and any other processes may be repeated by the machine learning algorithm for one or more of the, or all of the, tokens selected as semantic role classification candidates. Once all selected tokens are assigned semantic role classifiers, the utterance may be identified as a semantically classified utterance. As such, the machine learning algorithm may use the semantically classified utterance to predict an intent. The machine learning algorithm may provide a response to the utterance based on the predicted intent. The response may be provided in the same format in which the message was received. As such, the response may be provided as a voice response, a message response, a chat response, or any other suitable response.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 5 shows yet another illustrative diagram in accordance with principles of the invention.

DETAILED DESCRIPTION OF THE DISCLOSURE

Figure 1:
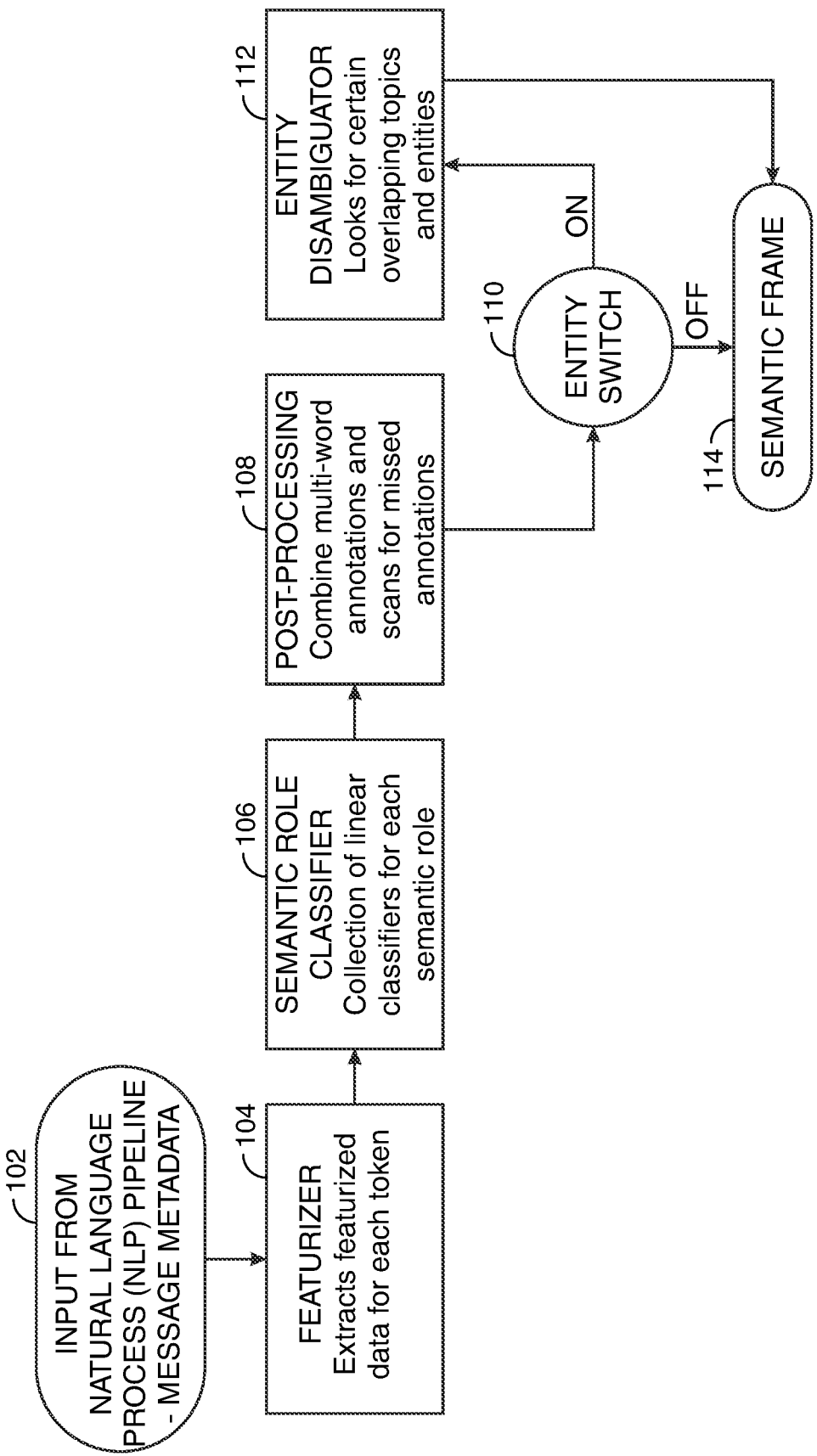
FIG. 1 shows an illustrative diagram in accordance with principles of the invention.

Apparatus, methods, and systems for a dynamic semantic role classifier is provided. Apparatus may include an entity Interactive Voice and Text Response ("IVTR") system (also referred to herein as an IVR system). The IVTR may be configured to communicate via telephone calls, short messaging service ("SMS") messages, multimedia messaging service ("MMS") messages or any other suitable communication methods. The IVTR may be a computing system, a network of computing devices, or any other suitable communication system. The IVTR system may be comprised of one or more computing devices. The computing devices included in the IVTR system may be laptops, desktops, mobile phones, smartphones, tablets, or any other suitable computing device.

The computing device may include all or some of natural computing components. The computing device may include some or all of the following: RAM, ROM, input/output modules, non-transitory memory, nonvolatile memory, processors, EEPROM, or any other suitable computing components. The memory may store operating systems, application systems, data, video, text, and/or audio assistance files.

The computing devices of the entity IVTR system may be connected in a network. The network may be a local area network (LAN) or a wide area network (WAN). The network may be a public network. The network may be a private network. The network may be an edge computing network. The network may be connected via TCP/IP, Ethernet, FTP, HTTP and any other suitable network connection.

The entity IVTR system may be configured to receive one or more communications from a node computer. The node computer may be included in a network of node computers. The node computer may or may not be a component included in the IVTR network. The node computer may be an entity separate from the entity's IVTR system. The node may be a laptop, smartphone, desktop, tablet, or any other suitable computing device. The node may include some or all the components of a computing device listed above.

A node may be configured to transmit a message to the entity IVTR system. The message may be transmitted in the form of text, chat, voice and/or any other suitable message delivery applications. The message may contain an utterance.

The IVTR system may be configured to receive the utterance included in the message. The IVTR system may be configured to index the utterance. Indexing the utterance may include identifying the tokens included in the utterance. The tokens may be words that are included in the utterance. Indexing the utterance may also include identifying a position of each token within the utterance. Indexing may include identifying a number of tokens included in the utterance. Indexing may include assigning an index number to each of the one or more tokens. The index number assigned to each token may be based on the position of the token and the number of tokens within the utterance.

The apparatus may further include a machine learning algorithm. The machine learning algorithm may reside on a hardware processor. The hardware processor may be included in the entity computing device. The hardware processor may be operating in tandem with hardware memory. The machine learning algorithm may use semantic role classification to identify an intent of an utterance sent by a node computer.

The machine learning algorithm may be configured to select tokens for semantic role classification. Some of the one or more tokens within an utterance may not add substantive meaning to the utterance. Tokens that do not add substantive meaning may not be candidates for semantic role classification. Semantic role classification may enable the machine learning algorithm to provide possible intents to an utterance. Tokens that may add substantive meaning may utilize semantic role classification. The machine learning algorithm may select tokens for semantic role classification.

The semantic role classifier may be comprised of a group of sematic role classifiers. The group of semantic role classifiers may include semantic role classifiers such as: action, topic, topic-modifier, question and negation. The group of semantic role classifiers may include any other suitable semantic role classifiers. The group of semantic role classifiers may be dynamically updated using training data sets and testing data sets. New semantic role classifiers may be added to the group based on data collected from the training data sets and testing data sets.

For each selected token, the machine learning algorithm may be configured to instantiate a model for each semantic role classifier within the group of semantic role classifiers. The selected token may be evaluated against each of the semantic role classifiers. The pairing of each semantic role classifier with the selected token may be assigned a value. The value may be a correlation value. The correlation value may represent the degree to which the selected token and the semantic role classifier are associated.

The machine learning algorithm may be further configured to calculate a threshold value. The threshold value may be a predetermined value. The threshold value may be a threshold correlation value. The threshold value may be a base value that the correlation value may surpass in order to assign a specific semantic role classifier to a selected token. The predetermined threshold value may be determined based on industry-specific classifiers. The predetermined threshold value may be a minimum value.

At times upon the calculation of correlation values between a first token and a plurality of semantic role classifiers, there may be more than one semantic role classifier that is assigned a correlation value that is greater than the predetermined threshold value. The machine learning algorithm may be configured to compare the calculated correlation values. The semantic role classifier that has the highest correlation value may be the semantic role classifier that has the greatest association with the selected token. The semantic role classifier with the highest correlation value may be assigned to the selected token.

The machine learning algorithm may be configured to change semantic role classifiers assigned to tokens within the utterance. The machine learning algorithm may be configured to remove a semantic role classifier from tokens included in the utterance. The machine learning algorithm may be configured to add semantic role classifiers to tokens within the utterance.

Apparatus may be further configured to assign a semantic role classifier to all selected tokens within the utterance. The machine learning algorithm may use the semantically classified utterance to identify potential intents to the utterance. Based on the semantic classification, the machine learning algorithm may select an intent of the utterance. Based on the identified intent the machine learning algorithm may provide a response to the utterance. The response may be sent from the entity IVTR system to the node via any suitable communication method.

The machine learning algorithm may be further configured to use training data sets to dynamically update the semantic role classifier. The training data sets may be used to improve the semantic role classifier. The machine learning algorithm may also be configured to use the training data sets in tandem with testing data sets to dynamically update the semantic role classifier.

Apparatus may include wherein the semantic role classifier may use a Java®-based model. The semantic role classifier may use any suitable model for semantic role classification.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The steps of methods may be performed in an order other than the order shown or described herein. Embodiments may omit steps shown or described in connection with illustrative methods. Embodiments may include steps that are neither shown nor described in connection with illustrative methods.

FIG. 1 shows illustrative process 100. Illustrative process 100 begins at step 102. At step 102 an input from a natural language processor (NLP) pipeline may be sent to semantic role classifier 106. The input from the NLP pipeline may be an utterance. The utterance may include metadata. The utterance may be comprised of one or more tokens. The utterance may be sent from a node to an entity IVR system. The entity IVR system may include the NLP pipeline. The utterance may be processed through the NLP pipeline into semantic role classifier 106.

At step 104, the utterance may go through a featurizer. The featurizer may extract featurized data for each token, included in the utterance. The featurizer may index the tokens. The featurizer may identify the one or more tokens. The featurizer may identify the position of the one or more tokens within the utterance. The featurizer may assign an index number to each of the one or more tokens based on the position of the one or more tokens within the utterance. The featurizer may select which tokens should be classified by the semantic role classifier 106. The featurizer may place the selected tokens in a virtual word bin.

At step 106, the selected tokens may be assigned a semantic role classifier. The semantic role classifier may be connected to a database of semantic role classifiers. The database of semantic role classifiers may include a plurality of predetermined semantic roles. Examples of semantic role classifiers included in the database may include; action, topic, topic-modifier, negation and question.

Semantic role classifier 106, may assign a semantic role classifier to each of the selected tokens. The selected tokens may have been previously selected at step 104. For each selected token, the semantic role classifier may create a plurality of models. Each model included in the plurality of models may a selected token paired with one of the semantic role classifiers included in the group of semantic role classifiers. Each pairing between the selected token with its associated sematic role classifier may be assigned a correlation value. The semantic role classifier paired with the selected token that is determined to have the highest correlation value, may be assigned to the selected token. The correlation value of the semantic role classifier assigned to the selected token may be expected to reach a predetermined threshold value. If the correlation value of the semantic role classier does not reach the predetermined threshold value, the semantic role classifier may not be assigned to the selected token.

Step 108 shows post-processing. Semantic role classifier 106 may combine multi-word annotations. Post-processing 108 may also include scanning for missed annotations. At step 110, the semantic role classifier may determine if there is an entity switch suitable. If an entity switch is determined to be suitable, the process may proceed to step 112. Step 112 may include an entity disambiguator. Entity disambiguator 112 may look for certain overlapping topics and entities. If an entity switch is determined not to be suitable, the process may proceed to step 114. Step 114 may include creating a semantic frame based on the semantic role classification. After step 112 the process may also proceed to step 114.

Figure 2:
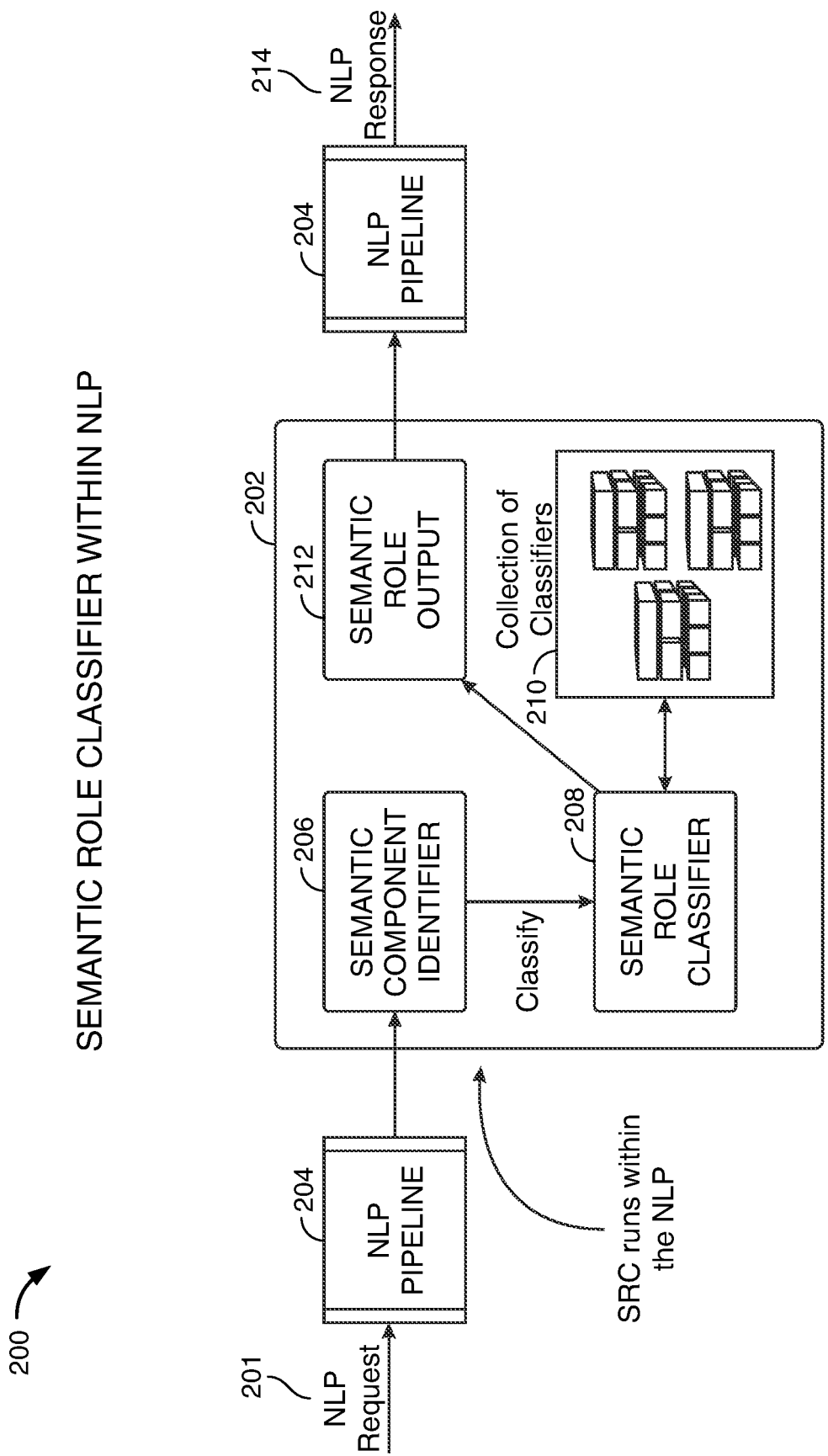
FIG. 2 shows another illustrative diagram in accordance with principles of the invention.

FIG. 2 shows illustrative process 200. Illustrative process 200 shows semantic role classification system 202 within natural language process (NLP) pipeline 204. NLP request 201 may be received through NLP pipeline 204. NLP request 201 may contain an utterance. The utterance may be transmitted from a node to an entity IVR system. NLP pipeline 204 may be included in the entity IVR system. Semantic role classification system 202 may be instantiated in NLP pipeline 204. NLP request 201 may be passed through NLP pipeline 204 into semantic role classification system 202.

Semantic component identifier 206 may receive NLP request 201. Semantic component identifier 206 may include featurizer 104 (shown in above FIG. 1). Semantic component identifier 206 may index the tokens included in the utterance and select tokens for semantic role classification.

Semantic role classifier 208 may have the same functions as semantic role classifier 106 (shown in above FIG. 1). Semantic role classifier 208 may assign a semantic role classifier to each selected token. Semantic role classifier 208 may assign semantic roles from collection of classifiers 210. Collection of classifiers 210 may include classifiers such as topic, action, topic-modifier, question, negation and/or any other suitable semantic role classifier.

Once semantic role classifier 208 assigns a semantic role classifier to the selected token, semantic role classification output 212 is provided. Semantic role classification output 212 contains each selected token from NLP request 201 and its corresponding semantic role classifiers. Semantic role classification output 212 is transmitted through NLP pipeline 204. NLP response 214 may be determined using the information from the featurizer and semantic component identifier 206. NLP response 214 may be a response to NLP request 201.

Figure 3:
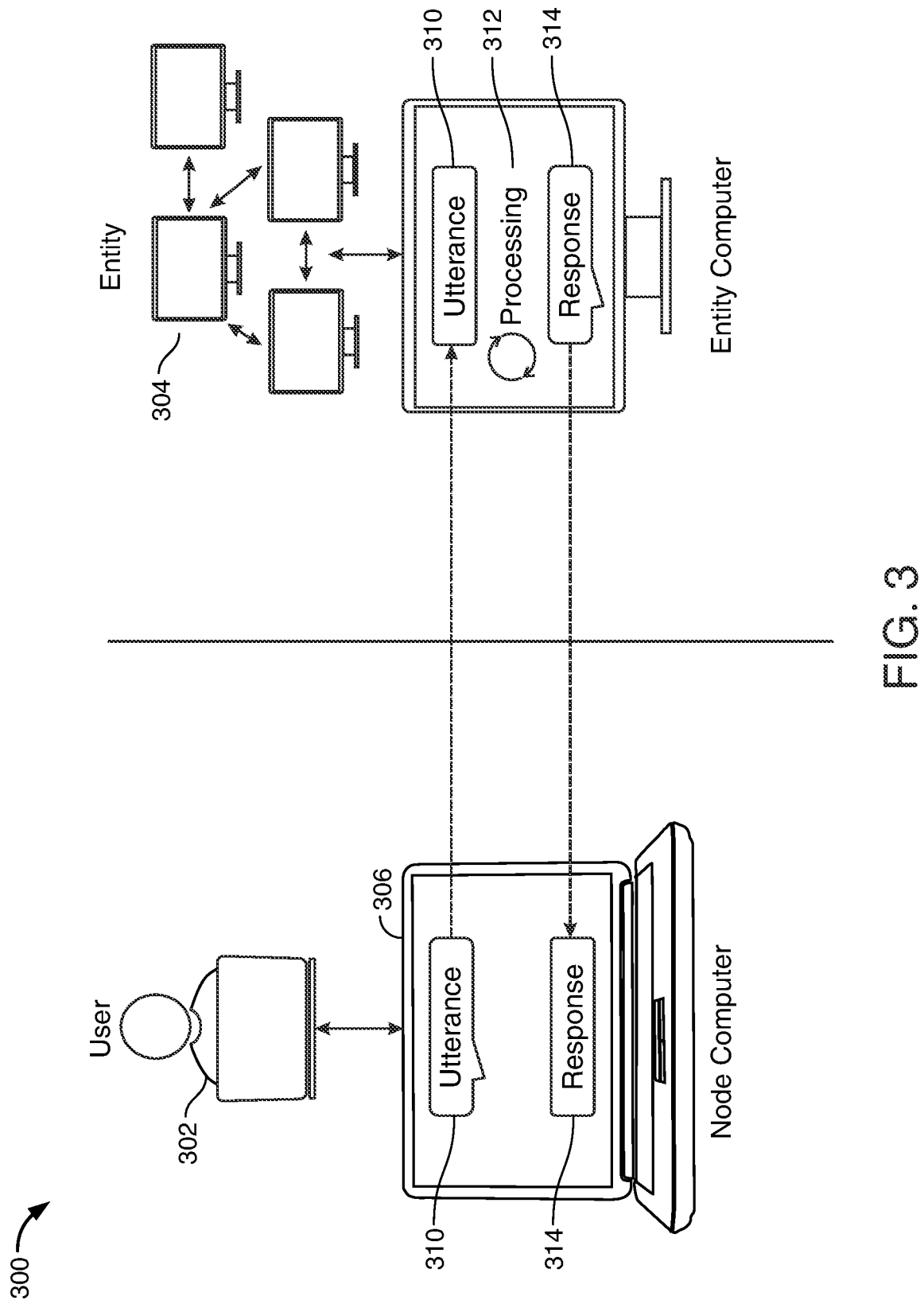
FIG. 3 shows yet another illustrative diagram in accordance with principles of the invention.

FIG. 3 shows illustrative process 300. Illustrative process 300 may include user 302. User 302 may be any suitable node communicating with entity 304 through a communication system, such as an interactive voice response (IVR) system. User 302 may use node 306 to communicate with entity 304.

Node 306 may be a laptop, smartphone, tablet, desktop, or any other suitable computing device. Entity 304 may be a network of nodes, a computing system, or any other suitable entity network. User 302 may transmit utterance 310 to entity 304. Utterance 310 may be a question relating user 302 to entity 304. Utterance 310 may be any form of suitable communication between user 302 and entity 304. Entity 304 may receive utterance 310. Entity 304 may send utterance 310 for processing 312. Processing 312 may include assigning semantic role classifiers to tokens included in utterance 310. Using the semantic role classifiers, entity 304 may identify an intent of utterance 310. Based on the intent, entity 304 may transmit response 314. Response 314 may be a response to utterance 310. User 302 may receive response 314.

Figure 4:
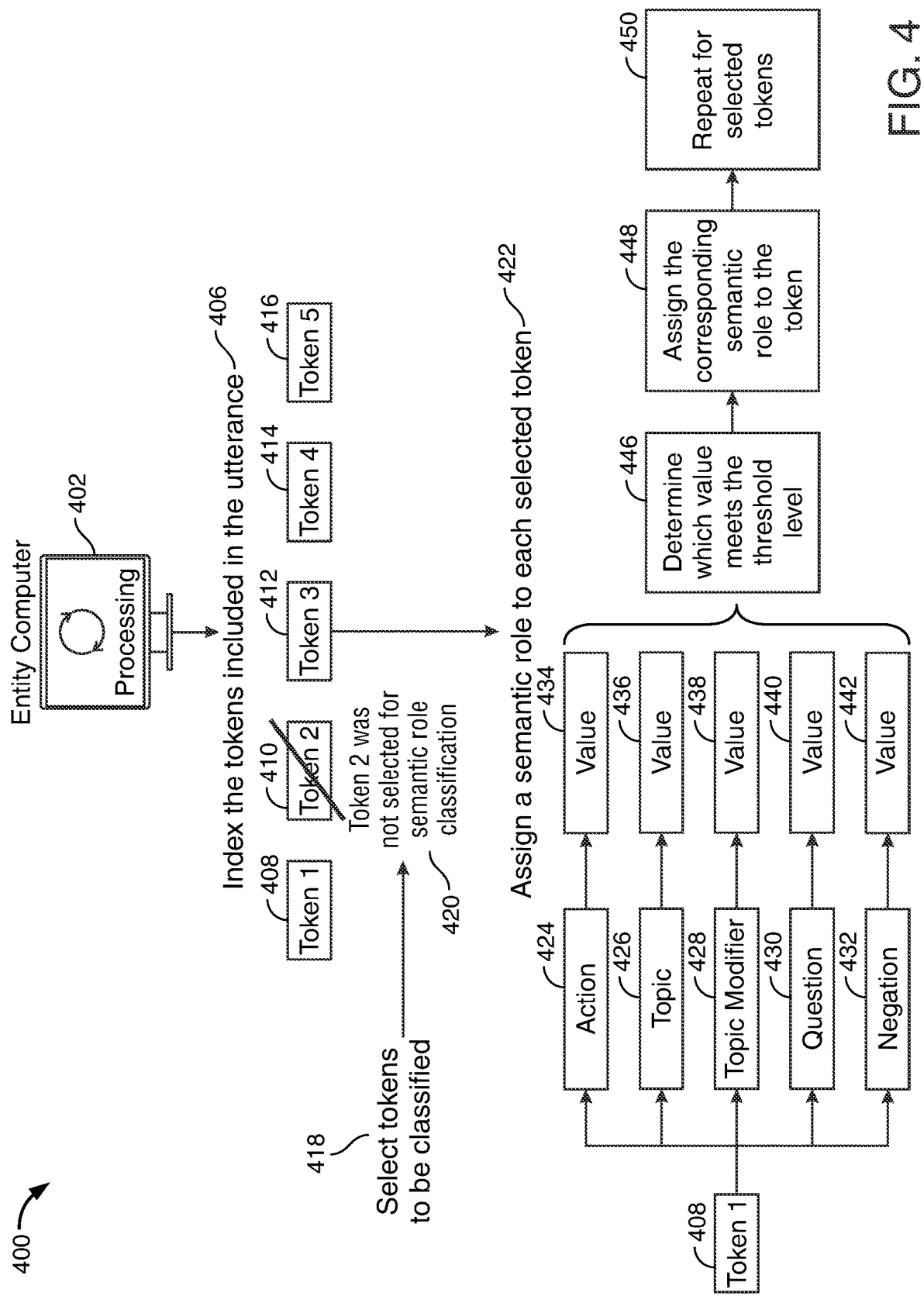
FIG. 4 shows still another illustrative diagram in accordance with principles of the invention.

FIG. 4 shows illustrative process 400. Illustrative process 400 shows processing 402 (as shown in above FIG. 3) in greater detail. Processing 402 may include indexing 406. Indexing 406 may include identifying tokens included in the utterance. The following may be identified: token 408, token 410, token 412, token 414 and token 416. Indexing 406 may also include assigning an index number to each token based on the position of each token, from left to right. Token 408 is the first token within the utterance and therefore may be assigned 'token 1'. Token 410 is the second token within the utterance and therefore may be assigned 'token 2'. Token 412 is the third token within the utterance and therefore may be assigned 'token 3'. Token 414 is the fourth token with the utterance and therefore may be assigned 'token 4'. Token 416 is the fifth token within the utterance and therefore may be assigned 'token 5'.

Upon indexing the tokens included in the utterance, selecting 418 may be executed. Selecting 418 may include selecting tokens for semantic role classification. Some tokens may not utilize semantic role classification. For example, at step 420, token 410 was not selected for semantic role classification. Tokens 408, 412, 414, and 416 may have been selected for semantic role classification.

After the tokens are selected, semantic role classification 422 may begin. Stating with token 408, sematic role classification 422 may create a separate model for each of the semantic role classifiers. For example, semantic role classifier, action 424, may be assigned to token 408 in a first model. In parallel to the first model, semantic role classifier, topic 426, may also be assigned to token 408. All the semantic role classifiers included in the group of semantic role classifiers, may be set up as a separate model for classification with the selected token. Token 408 may be assigned action 424, topic 426, topic-modifier 428, question 430 and negation 432.

Step 446 may include determining which of the calculated correlation values meet the predetermined threshold value. For a specific semantic role to be assigned to a selected token, the correlation value is expected to meet, or meets, the predetermined threshold value. Step 448 may include assigning a semantic role to the selected token. The machine learning algorithm may identify which calculated correlation value, from among the correlation values that meet the predetermined threshold value, is the highest correlation value. The semantic role classifier with the highest correlation value may be assigned to the selected token. At step 450, the process demonstrated in processing 402 may be repeated for all tokens included in the utterance.

FIG. 5 shows illustrative diagram 500. Illustrative diagram 500 shows a group of semantic role classifiers. The group of semantic role classifiers may include classifiers: 502, 504, 506, 508 and 510. The group of semantic role classifier may be industry specific. Semantic role classifier 504 may be an action classifier. An action classifier may classify what is happening in the sentence. Action classifier 504 may be a verb. Semantic role classifier 502 may be a topic classifier. Topic classifier 502 may include the tokens of the utterance that the action is describing. Topic classifier 502 may be a noun or a compound noun. Semantic role classifier 506 may be a topic-modifier classifier. Topic-modifier classifier 506 may be describe the topic. Topic-modifier classifier 506 may be an adjective. Semantic role classifier 508 may be a question classifier. Semantic role classifier 510 may be a negation classifier. Negation classifier 510 may negate the meaning of the sentence or phrase.

Utterance 501 may be an utterance received from a node at the entity IVR system. Utterance 501 may include a plurality of tokens. Utterance 501 may include tokens 512, 516, 518, and 520. Utterance 501 may include group of tokens 514. Token 512 may be a first token within the utterance. Tokens 512, 516, 518, and 520 may be selected for semantic role classification. Token 512 may be assigned question classifier 508. Token 516 may be assigned action classifier 504. Token 518 may be assigned topic-modifier classifier 506. Token 520 may be assigned topic classifier 502. Group of tokens 514 may not be selected for semantic classification.

Utterance 503 may include tokens 522, 524, and 526. Tokens 522 and 526 may be selected for semantic role classification. Token 522 may be classified as an action. Token 522 may be assigned action classifier 504. Token 522 may describe what is happening in the sentence. Token 526 may be assigned topic classifier 502. Token 526 may describe to what the action is happening. In utterance 503 the action may be 'activate' and the topic may 'debit card.' Utterance 503 may be instructing the activation of the debit card. Token 524 may not be selected for semantic role classification.

Utterance 505 may include tokens 528, 530, 532, and 534. Tokens 528, 530, and 534 may be selected for semantic role classification. Token 528 may be assigned question classifier 508. Token 530 may be assigned action classifier 504. Token 534 may be assigned topic classifier 502. Token 532 may not be selected for semantic role classification.

Thus, methods and apparatus for DYNAMIC SEMANTIC ROLE CLASSIFICATION are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. A method for semantic role classification, said method being practiced in a computer network, said computer network comprising a plurality of nodes, the method comprising:

receiving at an entity's Interactive Voice Response (IVR) system, an utterance from a node, said node from one of the plurality of nodes, said utterance including one or more tokens;

indexing the one or more tokens, said indexing comprising, assigning an index number to each of the one or more tokens, said assigning based on a number of tokens included in the utterance and a position of the one or more tokens within the utterance;

selecting tokens, from among the one or more tokens, for semantic role classification, said selected tokens placed in a virtual word bin; and assigning a semantic role classifier, from a group of semantic role classifiers, for each selected token included in the virtual word bin, said assigning comprising initiating a model for each semantic role classifier included in the group of semantic role classifiers, said initiating the model comprising:

classifying each selected token as each semantic role classifier included in the group of semantic role classifiers;

calculating a value, said value being a correlation value, said correlation value defining a level to which the selected token is associated with each semantic role classifier included in the group of semantic role classifiers;

determining which of the calculated correlation values meets a predetermined threshold value, said predetermined threshold value calculated based on industry-specific classifiers;

for each selected token, finalizing an associated semantic role classifier, said finalizing based on the determinations, the associated semantic role classifier having a correlation value that is a highest correlation value from among a group of semantic role classifiers that were calculated to be over the predetermined threshold value; and assigning to each token the semantic role classifier that has the highest correlation value.

2. The method of claim 1 further comprising using a machine learning algorithm to assign one or more semantic role classifiers to the one or more tokens in the utterance.

3. The method of claim 1, further comprising using a training data set to dynamically update the group of semantic role classifiers.

4. The method of claim 3, the method further comprising, adding one or more semantic role classifiers based on one or more new roles identified in the training data set.

5. The method of claim 1 further comprising using a testing data set to dynamically update the group of semantic role classifiers.

6. The method of claim 1, further comprising adding, removing, or changing the semantic role classifiers assigned to the one or more tokens in the utterance.

7. The method of claim 1, the group of semantic role classifiers comprising:
topic;
action;
topic-modifier;
question; and
negation.

8. The method of claim 1, wherein the assigning the semantic role classifiers uses a Java®-based model.

9. The method of claim 1, the method further comprising determining the correlation value, said determining comprising:
calculating a value that indicates that a token accurately correlates to one of the semantic role classifiers included in the group of semantic role classifiers; and
assigning the correlation value to a pairing of the selected token with the associated semantic role classifier.

10. The method of claim 1, wherein the predetermined threshold value is a minimum value used to assign a specific semantic role to a token.

11. An apparatus for dynamic semantic role classification, the apparatus comprising:
an entity Interactive Voice and Text Response (IVTR) system, said IVTR system comprising a communication channel, said communication channel connecting and responding to receiving voice and/or text inputs from one or more user nodes, said IVTR configured to:
receive an utterance from one of the one or more user nodes;
tokenize the utterance into a plurality of tokens;
assign an index number to each of the plurality of tokens; and
use semantic role classification to identify an intent to the utterance, said identification comprising a machine learning algorithm, said machine learning algorithm residing on a hardware processor, said hardware processor operating in tandem with hardware memory, said machine learning algorithm configured to:
select tokens appropriate for semantic role classification, from among the plurality of tokens; and
assign, using an assignation subsystem, a semantic role classifier, selected from a group of semantic role classifiers, to each of the selected tokens, said assignation subsystem operable to:
instantiate a model for each semantic role classifier included in the group;
classify each selected token as each semantic role classifier included in the group;
calculate a correlation value, said correlation value defining a level to which the selected token is associated with each semantic role classifier included in the group;
determine which of the calculated correlation values meets a predetermined threshold value;
for each selected token, identify a final associated semantic role classifier, said final associated semantic role classifier based on the determination of which of calculated correlation values meet the predetermined threshold value, the associated semantic role classifier having a correlation value that is a highest correlation value from among a group of semantic role classifiers that were calculated to be over the predetermined threshold value;
for each token, assign the semantic role classifier that has the highest correlation value;
use the semantic role classifiers assigned to each token to generate an intent for the utterance; and
identify a response to the utterance based on the intent.

12. The apparatus of claim 11, the machine learning algorithm further configured to use a training data set to dynamically update the group of semantic role classifiers.

13. The apparatus of claim 12, the machine learning algorithm further configured to add one or more semantic role classifiers based on one or more new semantic roles identified in the training data set.

14. The apparatus of claim 11, the machine learning algorithm further configured to use a testing data set to dynamically update the group of semantic role classifiers.

15. The apparatus of claim 11, the machine learning algorithm is further configured to add, remove or change the semantic role classifiers assigned to the selected tokens.

16. The apparatus of claim 11, wherein the group of semantic role classifiers comprises:
topic;
action;
topic-modifier;
question; and
negation.

17. The apparatus of claim 11, the machine learning algorithm is further configured to:
determine the correlation value;
calculate a value that indicates that a token accurately correlates to one of the semantic role classifiers included in the group of semantic role classifiers; and
assign the correlation value to a pairing of the selected token with the semantic role classifier.

18. The apparatus of claim 11, the machine learning algorithm is further configured to compare the correlation values assigned to each of the assigned sematic role classifiers.

19. The apparatus of claim 11, wherein the predetermined threshold value is a minimum value used to assign a specific semantic role to a token.

20. The apparatus of claim 11, the semantic role classifier is further configured to use a Java®-based model.

* * * * *